(12) United States Patent
Elsing et al.

(10) Patent No.: US 6,304,411 B1
(45) Date of Patent: Oct. 16, 2001

(54) SPRING-CONTACT SPINDLE CONNECTOR

(75) Inventors: John William Elsing, Edina; Michael David Schroeder, Webster; Charles H. Smith, Apple Valley, all of MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/314,234

(22) Filed: May 18, 1999

Related U.S. Application Data (60) Provisional application No. 60/085,791, filed on May 18, 1998.

(51) Int. Cl.[7] ............................ G11B 33/12; G11B 5/012; H01R 9/09
(52) U.S. Cl. ........................................ 360/97.01; 439/67
(58) Field of Search ............................ 360/97.01, 97.02, 360/97.03, 98.07, 99.04, 99.08; 439/66, 67, 77

(56) References Cited

U.S. PATENT DOCUMENTS

| | | | |
|---|---|---|---|
| 5,064,377 | * 11/1991 | Wood | 439/67 |
| 5,337,202 | * 8/1994 | Jabbarai et al. | 360/97.01 |
| 5,541,787 | * 7/1996 | Jabbari et al. | 360/97.01 |
| 5,751,514 | * 5/1998 | Hyde et al. | 360/97.01 |
| 5,760,997 | * 6/1998 | Koyanagi et al. | 360/97.01 |
| 5,931,697 | * 8/1999 | Jeong | 439/556 |
| 5,966,267 | * 10/1999 | Hooley et al. | 360/97.01 |
| 5,997,357 | * 12/1999 | Grantz et al. | 439/660 |

FOREIGN PATENT DOCUMENTS

| | | |
|---|---|---|
| 3-183093 | * 8/1991 | (JP) . |
| 5-54625 | * 3/1993 | (JP) . |
| 7-14362 | * 1/1995 | (JP) . |

\* cited by examiner

*Primary Examiner*—David L. Ometz
(74) *Attorney, Agent, or Firm*—Schwegman, Lundberg, Woessner & Kluth, P.A.

(57) ABSTRACT

A disc drive system includes a base or deck, a disc stack rotatably attached to the base, and an actuator assembly movably attached to the base. The disc stack includes a spindle, a hub attached to the spindle and discs attached to the hub. The spindle is attached to the base or deck using a fastener that passes into a threaded opening in the spindle. The spindle also includes several electrical contact pads. The base or deck has openings positioned near the electrical contact pads as well as an opening through which the fastener passes to mount the spindle to the base or deck. A printed circuit board is connected to the bottom of the base or deck. A connector is used to attach the electrical contact pads on the spindle to the electronics on the printed circuit board. The connector includes several contact elements. The contact elements extending through openings in the deck and contact a corresponding electrical contact pad on the spindle. The connector includes a ring of material that attaches to the printed circuit board to provide a strain relieved connection. The connector also supports the electrical contacts and is made of an insulative material. The electrical contacts have a spring end which is cantilevered off the ring. The spring end extends from the ring providing a preloaded contact through openings in the base or deck and to the electrical contact pads on the printed circuit. The other end is soldered directly to the printed circuit board.

19 Claims, 6 Drawing Sheets

SPRING-CONTACT SPINDLE CONNECTOR

RELATED APPLICATION

This application claims the benefit of U.S. Provisional Application Serial No. 60/085,791, filed May 18, 1998 under 35 USC119(e).

FIELD OF THE INVENTION

The present invention relates to the field of mass storage devices. More particularly, this invention relates to a disc drive which includes a spindle motor having electrical contacts between a printed circuit board and the spindle.

BACKGROUND OF THE INVENTION

One of the key components of any computer system is a place to store data Computer systems have many different places where data can be stored. One common place for storing massive amounts of data in a computer system is on a disc drive. The most basic parts of a disc drive are a disc that is rotated, an actuator that moves a recording/playback transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically housed within a small ceramic block. The small ceramic block is passed over the disc in a transducing relationship with the disc. The transducer can be used to read information representing data from the disc or write information representing data to the disc. When the disc is operating, the disc is usually spinning at relatively high revolutions per minute ("RPM").

These days common rotational speeds are 7200 RPM. Some rotational speeds are as high as 10,000 RPM. Higher rotational speeds are contemplated for the future. These high rotational speeds place the small ceramic block in high air speeds. The small ceramic block, also referred to as a slider, is usually aerodynamically designed so that it flies over the disc. The best performance of the disc drive results when the ceramic block is flown as closely to the surface of the disc as possible. Today's small ceramic block or slider is designed to fly on a very thin layer of gas or air. In operation, the distance between the small ceramic block and the disc is very small. Currently, "fly" heights are only a few micro inches.

Information representative of data is stored on the surface of the memory disc. Disc drive systems read and write information stored on tracks on memory discs. Transducers, in the form of read/write heads, located on both sides of the memory disc, read and write information on the memory discs when the designated transducer is accurately positioned over the designated track on the surface of the memory disc. The transducer is also said to be moved to a target track. As the memory disc spins and the read/write head is accurately positioned above a target track, the read/write head can store data onto a track by writing information representative of data onto the memory disc. Similarly, reading data on a memory disc is accomplished by positioning the read/write head above a target track and reading the stored material on the memory disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information. It should be noted that the tracks on a disc drive are very thin and closely spaced. Currently, track densities are greater than 10,000 tracks per inch. In practical terms, this means that there are as many as 12 tracks across the width of a single human hair. Of course, track densities will increase in the future.

In the past, the spindle or hub was mounted to the base or deck of the disc drive. The spindle included electrical contacts which formed electrical connections to the windings of the motor and possibly the center tap of the motor. The motor is commutated to spin the spindle and the attached hub. One or more discs are attached to the hub. A flex cable was used to connect the electrical contact pads on the spindle to the printed circuit board external to the disc enclosure. In some instances the deck included a special throughway that provided a sealed connection to the printed circuit board. The flex cable is long, and cumbersome in terms of manufacture. In addition, connector and seal through the base or deck of the disc drive is another special part which adds inventory during manufacture and which makes assembly more complex.

Some disc drives have replaced the spindle motor pads with pins that can be accessed with another connector that directly connects to the printed circuit board on the outside of the disc enclosure. In the past, these have been difficult to align and many times, during manufacture, the pins associated with the spindle or the connector to which the pins attach may become damaged. Both may also become damaged. In addition, the solder joints were the only means for holding the connector to the printed circuit board. In the presence of shock loading to the connector, the solder joints may break free and the disc drive would fail. There is also need for non-standard hardware that would cost more than a standard screw type fastener. A spanner type or flat nut is needed to hold the spindle of the in-hub motor in place. This special part costs much more than a standard connector. In addition, the spanner nut also tended to gall the deck as it was tightened. Galling caused the torque necessary to tighten the part to read high. When robots are used to attach the spindle to the base or deck of the disc drive, the robots tighten to a specified torque. With galling, the torque may be reached before the spindle is truly tightened.

To lessen the problems associated with previous spindle motor to printed circuit board connectors, there is a need for a connector which can directly connect the spindle motor to the printed circuit board. There is also a need for a connector which does not require accurate alignment. In other words, the connector should be more forgiving so that it can tolerate slight misalignments without damaging the printed circuit board or the electrical connectors of the spindle motor. What is also needed is a connector that resists breaking solder joint connections when the connector undergoes a shock loading event. Also needed is a reliable electrical connection so that the disc drive is also reliable.

SUMMARY OF THE INVENTION

A disc drive system includes a base or deck, a disc stack rotatably attached to the base, and an actuator assembly movably attached to the base. The disc stack includes a spindle, a hub attached to the spindle and discs attached to the hub. The spindle is attached to the base or deck using a fastener that passes into a threaded opening in the spindle. The spindle also includes several electrical contact pads The base or deck has openings positioned near the electrical contact pads as well as an opening through which the fastener passes to mount the spindle to the base or deck. A printed circuit board is connected to the bottom of the base or deck. A connector is used to attach the electrical contact pads on the spindle to the electronics on the printed circuit board. The connector includes several contact elements. The contact elements extending through openings in the deck and contact a corresponding electrical contact pad on the spindle. The connector includes a ring of material that attaches to the printed circuit board to provide a strain relieved connection. The connector also supports the electrical contacts and is made of an insulative material. The electrical contacts have a spring end which is cantilevered off the ring. The spring end extends from the ring, through openings in the base or deck and to the electrical contact pads on the spindle motor. The other end is soldered directly to the printed circuit board.

Advantageously, the connection between spindle motor and the printed circuit board is made directly. The connector which does not require accurate alignment and can tolerate slight misalignments without damaging the printed circuit board or the electrical connectors of the spindle motor. The connector also includes tabs that serve as strain relievers so that solder joints do not tend to break when the connector undergoes a shock loading event. The connector also provides a reliable electrical connection so that the disc drive is also more reliable. The invention also eliminates the need for a special non-standard spanner nut so that less expensive fasteners can be used. The spindle shaft no longer needs special outside threads. The standard fasteners use a standard thread inside the shaft and do not have problems with galling and therefore can be more reliably torqued using robotics during assembly. The effective shaft length is increased which allows increased bearing span which in turn reduces problems resulting from spindle tilt. The electrical connector is eliminated from within the shaft which simplifies construction of the spindle shaft. In addition, the shaft no longer needs a wide flange which saves material and machining time when compared to other methods. This also reduces spindle cost.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
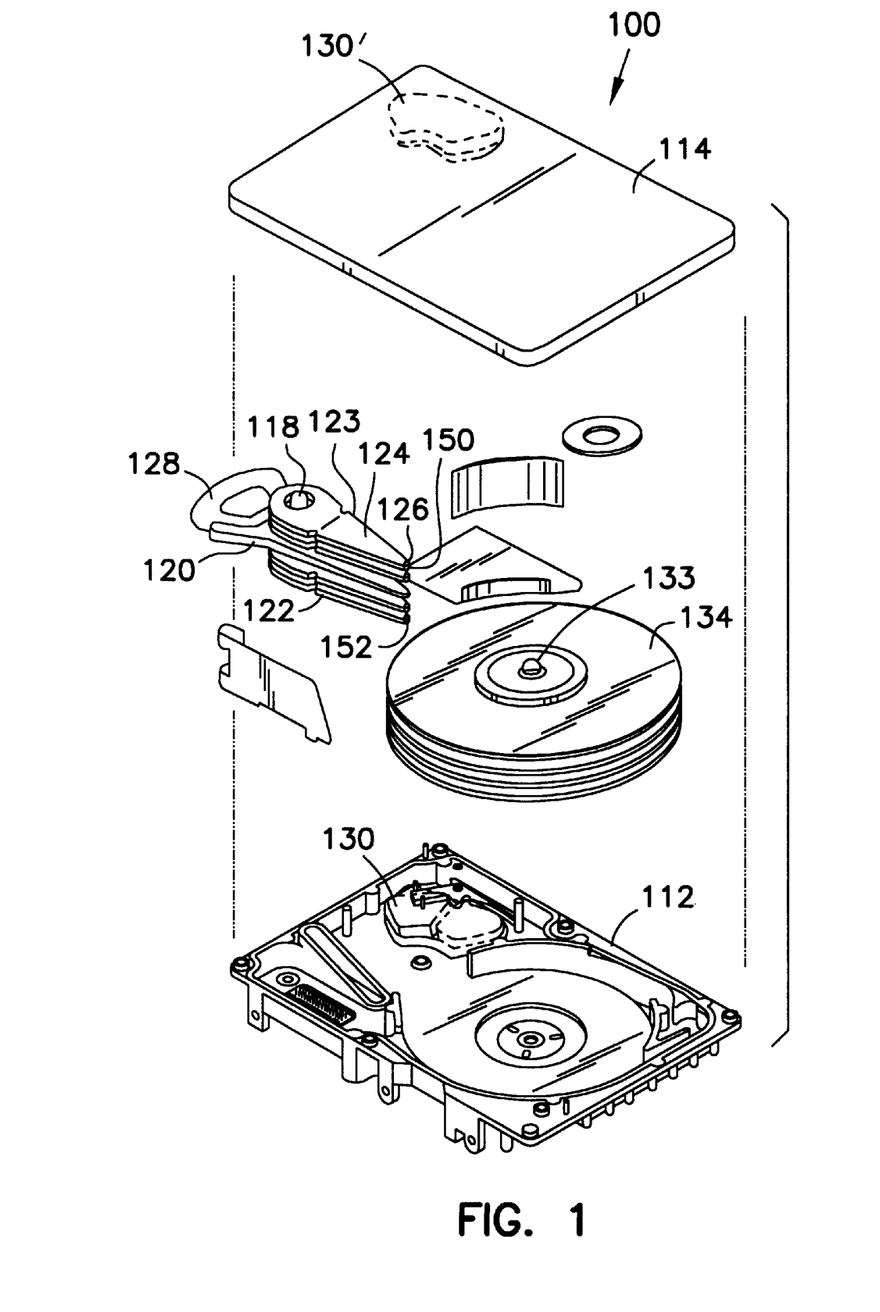
FIG. 1 is an exploded view of a disc drive with a multiple disc stack and a ramp assembly for loading and unloading transducers to and from the surfaces of the discs.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing 112, and a housing cover 114. The housing or base 112 and housing cover 114 form a disc enclosure. Rotatably attached to the housing 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that one actuator assembly has many transducers 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached to the housing 112 is one of a pair of magnets 130 and 130'.

The other of the pair of magnets 130' is attached to the housing cover 114. The pair of magnets 130 and 130', and the voice coil 128 are key parts of a voice coil motor which applies a force to the actuator assembly 120 to rotate it about the actuator shaft 118. Also mounted to the housing 112 are a spindle motor and spindle hub 30 133. The spindle motor is an "in-hub" motor which means the motor fits within the spindle hub 133. The spindle motor rotates the spindle hub. In FIG. 1, a number of discs 134 are attached to the spindle hub 133. In other disc drives a single disc or a different number of discs may be attached to the hub. The invention described herein is equally applicable to all other such disc drives.

Figure 2:
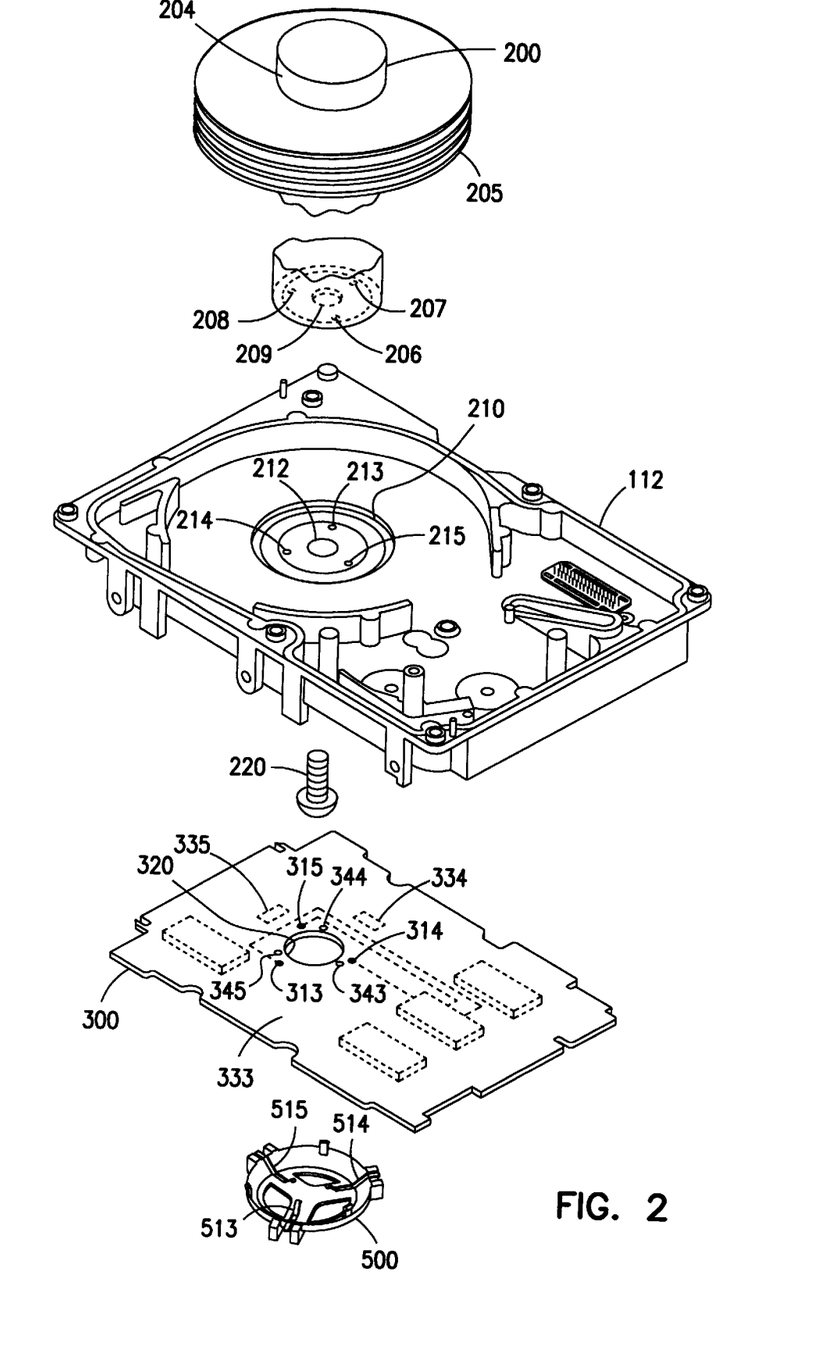
FIG. 2 is a partially exploded broken away view of a base, a printed circuit board, and a spindle of the present invention.

The invention deals with the electrical connection between the electrical pads of a spindle motor (shown in FIG. 6) and the electrical pads of the printed circuit board. FIG. 2 is a partially exploded broken away view of the base 112 (also called the deck), a printed circuit board 300, a spindle 200, and a connector 500 according to the present invention.

The base 112 includes a well 210. The well is sized to receive the spindle 200. At the bottom of the well 210 is an opening 212 for receiving a fastener 220. Positioned around the opening 212 are openings 213, 214 and 215. The spindle includes a fixed shaft 202 as well as a hub 204 which rotates about the fixed shaft 202. The hub 204 includes a flange 205 for carrying discs. An in-hub spindle motor (shown in FIG. 6) is used to rotate the hub 204 with respect to the fixed shaft 202. The in-hub motor includes windings which are commutated in order to turn the hub 204. Electrical energy or power is input to the windings via a set of pads 206, 207 and 208 positioned on one end of the fixed shaft 202. The fixed shaft also includes a threaded opening 209 which is located substantially along the axis of the fixed shaft 202 of the spindle 200. The spindle 200 is positioned within the well 2100 so that the electrical pads 206, 207 and 208 are positioned over the openings 213, 214 and 215 in the deck 112. A fastener 220 is then passed through the opening 212 in the base or deck 112 and threaded into the threaded opening 209 of the fixed shaft 202 of the spindle 200. The end result is that the spindle 200 is mounted to the deck or base 112 with the pads 206, 207 and 208 accessible through openings 213, 214 and 215 in the base or deck 112 of the disc drive 100.

Also shown in FIG. 2 is the printed circuit board 300. The printed circuit board includes electronics necessary to read and write data to the discs of the disc drive as well as motor controller electronics 310 which is used to control the speed at which the in-hub spindle motor (shown in FIG. 6) is commutated. The motor controller electronics 310 includes inputs and outputs which are used to deliver power to the windings of the in-hub motor as well as to receive control signals back from the in-hub motor. The printed circuit board 300 includes an opening 320. The opening is positioned so that when the printed circuit board is attached to the base 112 of the disc drive, the opening 320 will be large enough and in position so that the openings 213, 214 and 215 may be accessed through the opening 320. Positioned around the opening 320 are a set of pads 313, 314 and 315. The pad 313, 314 and 315 are connected to the motor controller electronics 310. The pads 313, 314 and 315 are positioned around the periphery of the opening 320. A connector 500 provides for direct attachment between the pads 313, 314 and 315 of the circuit board 300 to the pads 206, 207 and 208 on the fixed shaft 202 on the spindle 200. The connector 500 includes three contact elements 513, 514 and 515. Each of the contact elements has an up turned end which extends through the openings 213, 214 and 215 in the base and contacts a corresponding pad 206, 207 or 208 on the fixed shaft 202 of the spindle 200. The other ends of the contact elements 513, 514 and 515 are electrically connected to the pads 313, 314 and 315, respectively.

Figure 3:
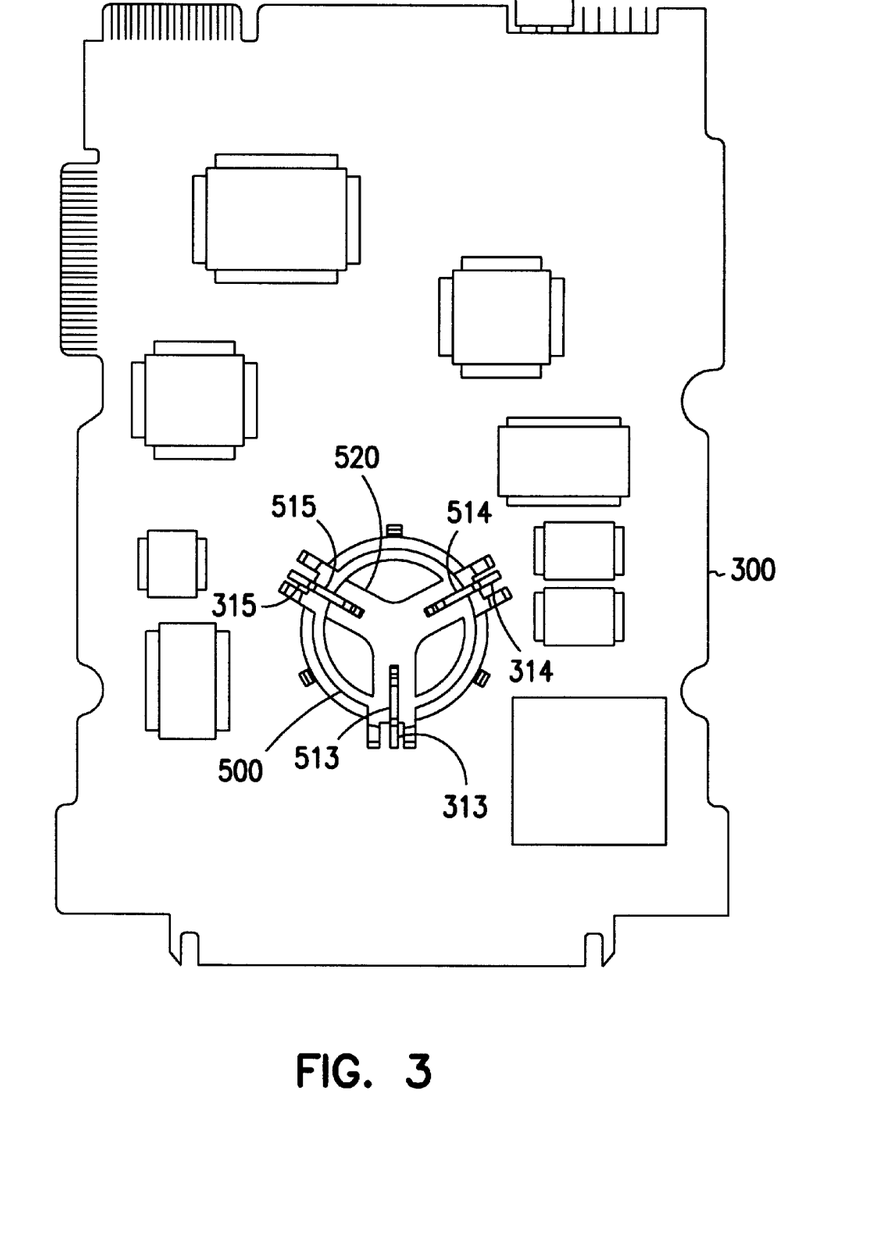
FIG. 3 is a bottom view of a printed circuit board.

FIG. 3 is a top view of the printed circuit board 300 with the connector 500 attached there too. The connector includes the contact elements 513, 514 and 515. The ends of the contact elements are electrically connected to pads 313, 314 and 315. The contact elements 513, 514 and 515 are supported by a Y-shaped cap 520. The printed circuit board 300 also includes a first slot 333, a second slot 334 and a third slot 335. The slots 333, 334 and 335 extend through the printed circuit board and form part of a strain relief mechanism. The printed circuit board also includes openings 343, 344 and 345. Openings 343, 344 and 345 are alignment openings which are used to align the connector 500 when it is attached to the printed circuit board 300.

Figure 4:
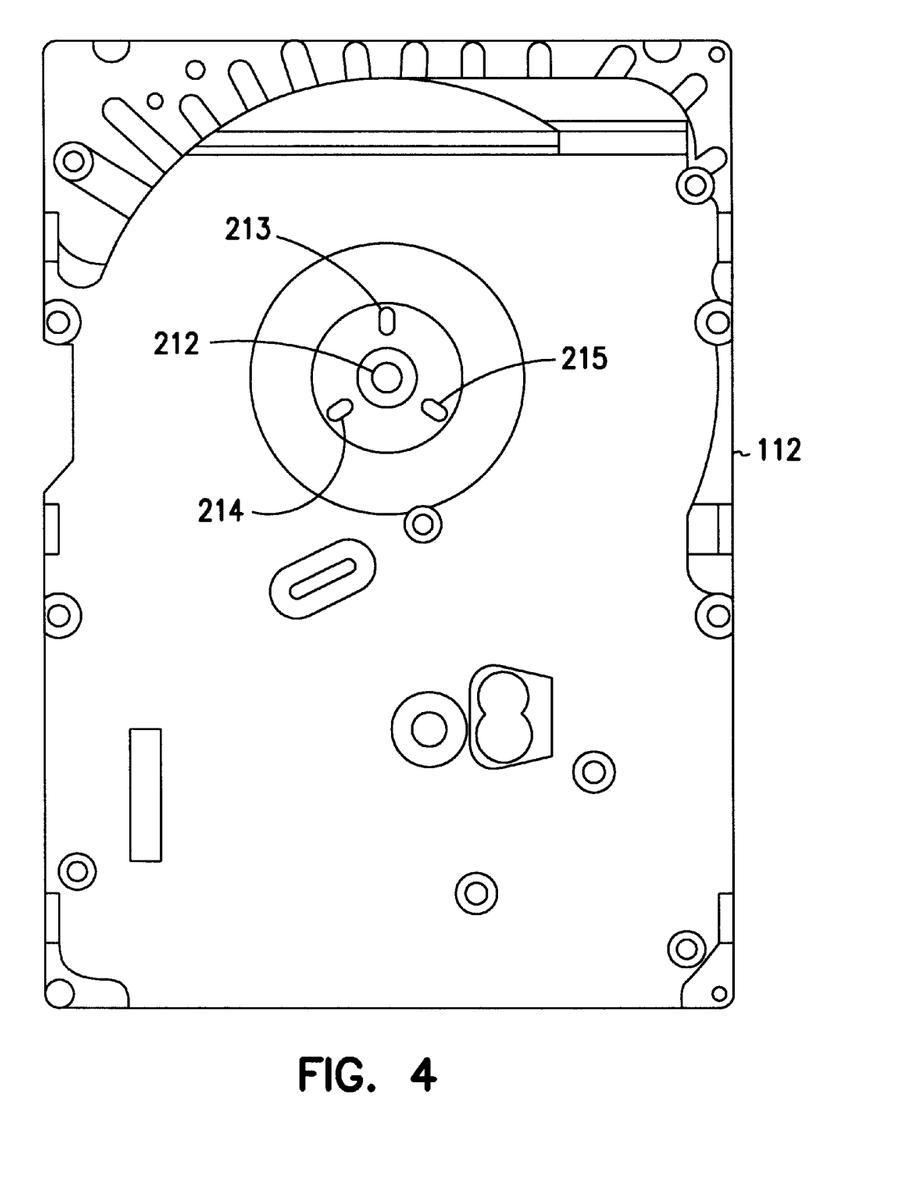
FIG. 4 is a bottom view of the base or deck of the disc drive.

FIG. 4 is a bottom view of the base 112 or deck of the disc drive 100. The opening 212 includes a bevel or countersunk portion so that a corresponding fastener 220 includes a portion which engages the bevel. The openings 213, 214 and 215 are positioned around the opening 212. The openings 213, 214, and 215 can be round as shown in FIG. 2 or can be more of a rounded slot as shown in FIG. 4.

Figure 5:
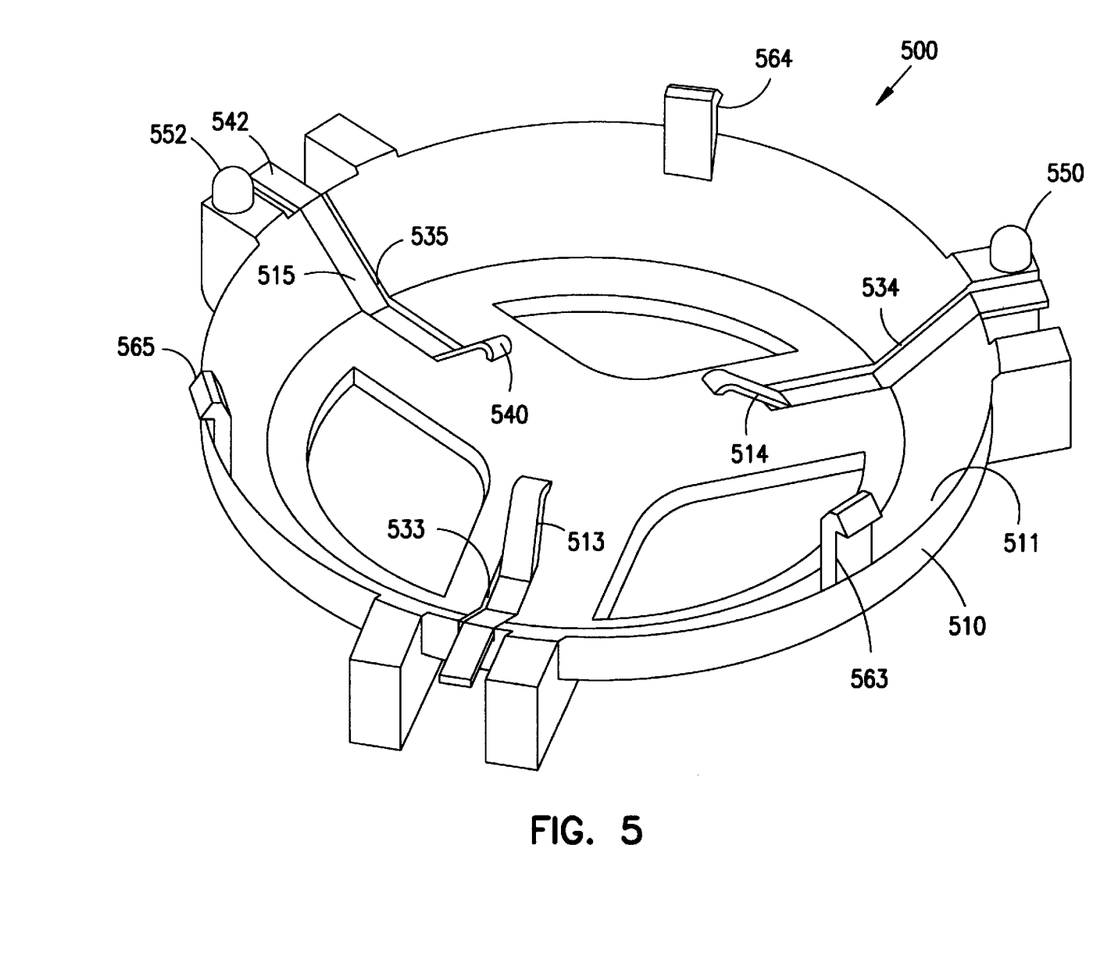
FIG. 5 is a perspective view of the connector.

FIG. 5 is a perspective view of the connector 500. The connector 500 includes a ring 510 and a cap 520. As shown in FIG. 5 the cap 520 is a y-shaped element. The cap 520 could also be solid and totally cover the inner portion of the ring 510. The ring 510 includes a beveled wall 511. The beveled wall includes a series of channels which extend through the ring 510 and into the cap 520. The channels 533, 534 and 535 are dimensioned to receive the contact elements 513, 514 and 515. The channels 533, 534 and 535 hold the electrical contacts 513, 514 and 515, respectively. Each of the contact elements 513, 514 and 515 includes a cantilevered end 540 and a solderable end 542. The cantilevered end is curved so that when the electrical contact contacts one of the electrical pads 206, 207 or 208 of the spindle, the curved cantilevered end will scrub across the pad and produce a good, reliable preloaded electrical contact. The free end 542 of the electrical contact is solderable and is positioned over one of the pads 313, 314 and 315 on the printed circuit board 300. The ring 510 includes at least two alignment knobs 550 and 552. The alignment knobs 550 and 552 fit within the alignment openings 343, 344 or 345 in the printed circuit board. The alignment knobs 552 and 550 are dimensioned so that they fit within any of the alignment openings 343, 344 and 345 of the printed circuit board 300. When the alignment knobs fit into any two of the three alignment openings 343, 344 or 345 the ring is aligned such that the solderable ends 542 of each of the contact elements 513, 514 and 515 are positioned over the pads 313, 314 and 315 on the printed circuit board which are in turn connected to the motor controller electronics module 310 by electrical pathways within the printed circuit board 300. Also attached to the ring 510 is a first flexible pawl 563, a second flexible pawl 564 and a third flexible pawl 565. The pawls 563, 564 and 565 have a flexible body and a hook end so that the flexible pawl 563, 564 and 565 may be inserted into any of the slots 333, 334 and 335 in the printed circuit board to produce a snap fit. The flexible body of the pawls 563, 564 and 565 flexes while the hook end engages the slots 333, 334 and 335. When finally inserted the flexible bodies 563, 564 and 565 snap back and allow the hook ends to latch into the open slots 333, 334 and 335 of the printed circuit board. The flexible pawls and their snap fit within the openings provide a strain relief mechanism which keeps the solderable ends 542 of the contact elements 513, 514 and 515 attached to the corresponding pads 313, 314 and 315 on the printed circuit board and preloaded in the event of a shock loading or bumping during manufacturer.

Figure 6:
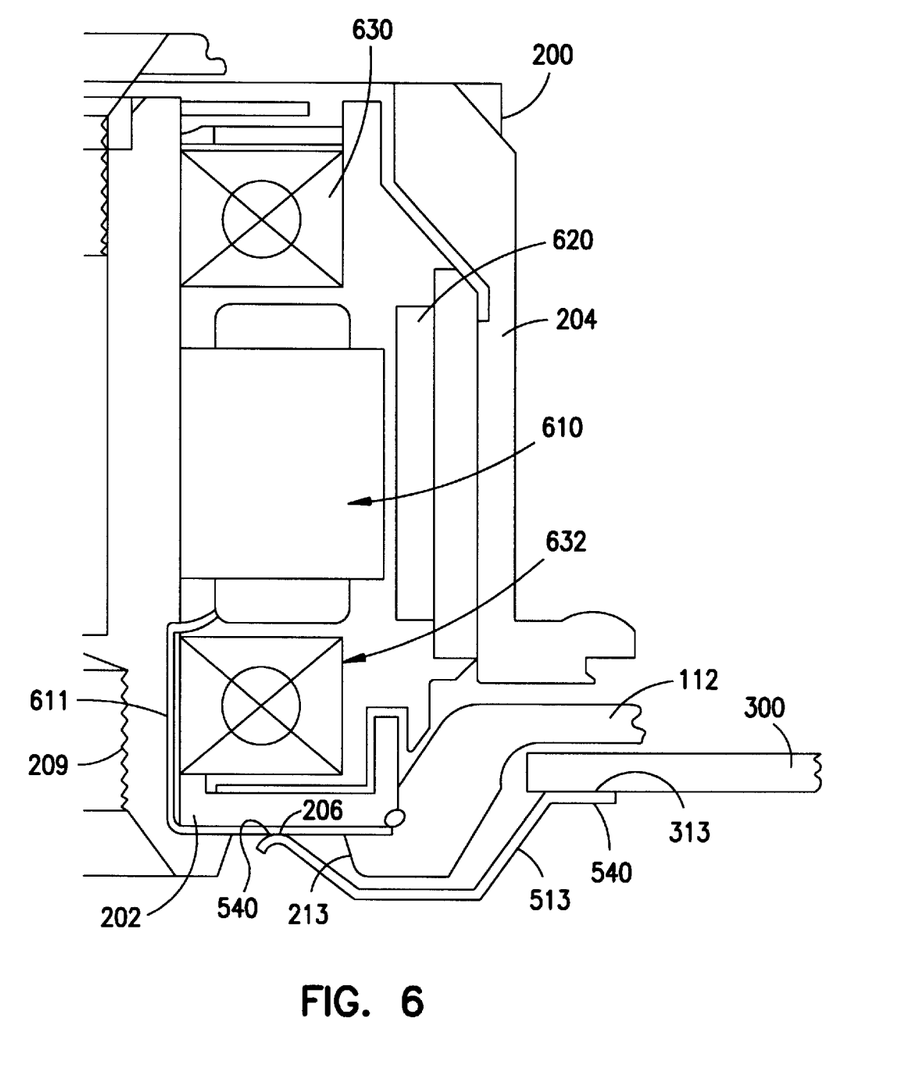
FIG. 6 is a cross section view of the connector attached to the spindle and to the electrical contact pads on the spindle of the disc drive.

FIG. 6 is a cross sectional view of a portion of the spindle attached to the base 112 and the printed circuit board 300. The fixed shaft 202 had an end with an electrical pad 206 thereon. The electrical pad 206 is connected to a motor winding 610 via a wire 611 that connects the pad 206 to the motor winding 610. The contact element with the cantilevered end 540 contacting the pad makes electrical contact between the pad 206 and the pad 313 on the printed circuit board 300. The printed circuit board 300 is attached to the bottom of the base 112 of the disc drive 100. Motor controller electronics 310 (shown in FIG. 3) controls the amount of electricity and the timing of the pulse that is sent to the windings to properly commutate the in-hub motor. An in-hub motor 600 is formed from the winding 610 and a magnet 620 is positioned inside the hub 204. The magnet 620 and the coils 610 form the in-hub motor. As can be seen, when assembled the contact element 513 extends into opening 213 in the base 112 of the disc drive 100. A first bearing 630 and a second bearing 632 allow the hub 204 to rotate about the fixed shaft 202 of the spindle 200. The opening 209 receives a standard screw. The standard screw can be used in lieu of any specialized fasteners for connecting the spindle to the base 112.

Advantageously, the connection between spindle motor and the printed circuit board is made directly. The connector which does not require accurate alignment and can tolerate slight misalignments without damaging the printed circuit board or the electrical connectors of the spindle motor. The connector also includes tabs that serve as strain relievers so that solder joints do not tend to break when the connector undergoes a shock loading event. The connector also provides a reliable electrical preloaded connection so that the disc drive is also more reliable. The invention also eliminates the need for a special non-standard spanner nut so that less expensive fasteners can be used. The spindle shaft no longer needs special outside threads. The standard fasteners use a standard thread inside the shaft and do not have problems with galling and therefore can be more reliably torqued using robotics during assembly. The effective shaft length is increased to increase the bearing span which in turn reduces problems resulting from spindle tilt. The electrical connector is eliminated from within the shaft which simplifies construction of the spindle shaft. In addition, the shaft no longer needs a wide flange which saves material and machining time when compared to other methods. This also reduces spindle cost.

Conclusion

As mentioned previously, a magnetic disc drive 100 includes a spindle 200 which in turn includes a first electrical contact pad 206 and a second electrical contact pad 207. The spindle 200 also has a threaded opening 209 therein. The disc drive 100 includes a deck 112 having a first opening 213 therein positioned near the first electrical contact pad 206 and a second opening 214 therein positioned near the second electrical contact pad 207. The deck 112 also has a third opening 212 therein positioned near the threaded opening 209. The threaded opening 209 receives a fastener to attach the spindle 200 to the deck 112. A printed circuit board 300 is connected to the deck 112 on a side opposite the spindle 200. A connector 500 is attached to the printed circuit board for making electrical connection between the first electrical pad 206 and the printed circuit board 300. The connection 500 also makes electrical connection between the second electrical pad and the printed circuit board.

Also disclosed is a magnetic disc drive 100 which includes a spindle 200 which in turn includes a first electrical contact pad 206 and a second electrical contact pad 207. The spindle 200 also has a threaded opening 209 therein. The disc drive 100 includes a deck 112 having a first opening 213 therein positioned near the first electrical contact pad 206 and a second opening 214 therein positioned near the second electrical contact pad 207. The deck 112 also has a third opening 212 therein positioned near the threaded opening 209. The threaded opening 209 receives a fastener to attach the spindle 200 to the deck 112. A printed circuit board 300 is connected to the deck 112 on a side opposite the spindle 200. A connector 500 is attached to the printed circuit board 300 and includes a first contact element 513 and a second contact element 514. The first contact element 513 extends through the first opening 213 in the deck 112 and contacts the first electrical contact pad 206. The second contact element 514 extends through the second opening 214 in the deck 112 and contacting the second electrical contact pad 207. The connector 500 further includes a latching mechanism for attaching the connector 500 to the printed circuit board 300. The magnetic disc drive of claim 3 wherein the latching mechanism includes a flexible pawl 563, 564, 565 having a hook end. The printed circuit board 300 includes an opening 333, 334, and 335 therein for receiving the flexible pawl 563, 564, 565. The pawl 563, 564, 565 is adapted to snap fit into the opening 333, 334, and 335 in the printed circuit board 300. The connector 500 further comprises a mechanism for aligning the connector 500 so the first contact element 513 aligns to the first electrical contact pad 206 on the spindle 200 and the second contact element 514 aligns to the second contact pad 207 on the spindle 200. The first contact element 513 and the second contact element 514 each include a cantilevered spring portion 540. The first contact element 513 and the second contact element 514 each have an end with a cantilevered spring portion 540 for contacting and preloading a pad 206, 207, 208 on the spindle 200. The first contact element 513 and the second contact element 514 each have another end 542 for contacting a pad 313, 314, 315 on the printed circuit board 300.

Also disclosed is a connector 500 for electrically connecting the coils of a spindle 200 motor to a printed circuit board 300 of a disc drive 100. The spindle motor has a first electrical pad 206 and a second electrical pad 207. The connector 500 further includes a ring 510. The ring 510 includes a first contact element 513 having a first cantilevered end 540 and a first solderable end 542. The first contact element 513 is attached to the ring 510. The ring 510 includes a second contact element 514 having a second cantilevered end 540 and a second solderable end 542. The second contact element 514 is also attached to the ring 510. At least two alignment knobs 550, 552 are attached to the ring 510. The alignment knobs 550, 552 are for aligning the ring 510 in an orientation so that the first contact element 513 aligns to one of the first electrical pad 206 and the second electrical pad 207, and so that the second contact element 514 aligns to the other of the first electrical pad 206 and the second electrical pad 207. The connector 500 further includes a strain relief mechanism adapted to latch to the printed circuit board 300. The strain relief mechanism includes a plurality of snap fit fingers 563, 564, 565 attached to the ring 510. The strain relief mechanism can also be said to include a plurality flexible pawls 563, 564, 565. Each of the flexible pawls 563, 564, 565 has a hook end. The connector 500 also includes a structure 520 attached to the ring 510 to support the first contact element 513 and the second contact element 514 at positions within the ring 510. The structure 520 may be a cap. The structure 520 is made of an electrically insulative material. The first contact element 513 and the second contact element 514 are made of electrically conductive material. The first contact element 513 is formed as a spring 510. The second contact element 514 is also formed as a spring 510.

Also disclosed is a printed circuit board 300 for making electrical connection to a set of electrical pads 206, 207, 208 of the spindle 200 of a disc drive 100. The printed circuit board 300 includes a motor controller electronic package 310 associated with the printed circuit board 300 and a plurality of contact pads 313, 314, 315 for making electrical connection to the motor controller electronics package 310. The printed circuit board 300 has a spindle access opening 320 therein. The contact pads 313, 314, 315 of the printed circuit board 300 are positioned near the spindle access opening 320 in the printed circuit board 300. An electrical contact 513, 514, 515 has a first end 542 and a second end 540. The first end 542 electrically attached to one of the plurality of contact pads 313, 314, 315 of the printed circuit board 300. The second end 540 is positioned to contact one of the pads associated with the spindle 206, 207, 208. The printed circuit board 300 further includes a ring 510 element attached to the printed circuit board 300 for supporting a portion of the electrical contact 513, 514, 515. The printed circuit board 300 has openings 333, 334, 335 about the periphery of the spindle access opening 320. The ring 510 element has at least two flexible fingers 563, 564, which extend into the openings 333, 334, 335 about the periphery of the spindle access opening 320.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A magnetic disc drive comprising:
   a spindle further comprising a first electrical contact pad and a second electrical contact pad, the spindle also having a threaded opening therein;
   a deck having
      a first opening therein positioned near the first electrical contact pad,
      a second opening therein positioned near the second electrical contact pad,
      a third opening therein positioned near the threaded opening, the threaded opening receiving a fastener to attach the spindle to the deck;
   a printed circuit board connected to an exterior surface of the deck, the spindle attached to an interior surface of the deck; and
   a connector attached to the printed circuit board further comprising:
      a first contact element extending through the first opening in the deck and contacting the first electrical contact pad; and
      a second contact element extending through the second opening in the deck and contacting the second electrical contact pad.

2. The magnetic disc drive of claim 1 wherein the connector further comprises a latching mechanism for attaching the connector to the printed circuit board.

3. The magnetic disc drive of claim 1 wherein the connector further comprises a mechanism for aligning the connector so the first contact element aligns to the first electrical contact pad on the spindle, and the second contact element aligns to the second contact pad on the spindle.

4. The magnetic disc drive of claim 1 wherein the first contact element and the second contact element each include a cantilevered spring portion.

5. The magnetic disc drive of claim 1 wherein the first contact element and the second contact element each have an end with a cantilevered spring portion for preloading and contacting the respective first or second contact pads on the spindle and wherein the first contact element and the second contact element each have another end for contacting a pad on the printed circuit board.

6. A magnetic disc drive comprising:
   a spindle further comprising a first electrical contact pad and a second electrical contact pad, the spindle also having a threaded opening therein;
   a deck having
      a first opening therein positioned near the first electrical contact pad,
      a second opening therein positioned near the second electrical contact pad,
      a third opening therein positioned near the threaded opening, the threaded opening receiving a fastener to attach the spindle to the deck;
   a printed circuit board connected to the deck on a side of the deck opposite a side of the deck to which the spindle is attached; and
   a connector attached to the printed circuit board further comprising:
      a first contact element extending through the first opening in the deck and contacting the first electrical contact pad;
      a second contact element extending through the second opening in the deck and contacting the second electrical contact pad; and
      a latching mechanism for attaching the connector to the printed circuit board, wherein the latching mechanism includes a flexible pawl having a hook end and the printed circuit board includes an opening therein for receiving the flexible pawl.

7. The magnetic disc drive of claim 6 wherein the pawl is adapted to snap fit into the opening in the printed circuit board.

8. A connector for electrically connecting the coils of a spindle motor to a printed circuit board of a disc drive, the spindle motor having a first electrical pad and a second electrical pad, the connector further comprising:
   a ring;
   a first contact element having a first cantilevered end and a first solderable end, the first contact element being attached to the ring; and
   a second contact element having a second cantilevered end and a second solderable end, the second contact element being attached to the ring; and
   at least two alignment knobs attached to the ring for aligning the ring in an orientation so that the first contact element aligns to one of the first electrical pad and the second electrical pad, and so that the second contact element aligns to the other of the first electrical pad and the second electrical pad.

9. The connector of claim 8 further comprising a strain relief mechanism adapted to latch to the printed circuit board.

10. The connector of claim 9 wherein the strain relief mechanism includes a plurality of snap fit fingers attached to the ring.

11. The connector of claim 9 wherein the strain relief mechanism includes a plurality flexible pawls, each of the flexible pawls having a hook end.

12. The connector of claim 9 further comprising a structure attached to the ring to support the first contact element and the second contact element at positions within the ring.

13. The connector of claim 12 wherein the structure is a cap.

14. The connector of claim 12 wherein the structure comprises an electrically insulative material.

15. The connector of claim 8 wherein the first contact element and the second contact element are made of electrically conductive material.

16. The connector of claim 8 wherein the first contact element is formed as a preloaded spring and the second contact element is formed as a spring.

17. A printed circuit board for making electrical connection to a set of electrical pads of a spindle of a disc drive, the printed circuit board comprising:
   a first major surface;
   second major surface;
   motor controller electronics associated with one of the first major surface or the second major surface of the printed circuit board;
   a plurality of contact pads for making electrical connection to the motor controller electronics located on one of the first major surface or the second major surface of the printed circuit board, the printed circuit board having a spindle access opening therein, the plurality of contact pads of the printed circuit board positioned near the spindle access opening in the printed circuit board; and an electrical contact having a first end and a second end, the first end electrically attached to one of the plurality of contact pads of the printed circuit board located on one of the first major surface or the second major surface of the printed circuit board and the second end extending past the other of the first major surface or second major surface of the printed circuit board, the electrical contact positioned to contact one of the pads associated with the spindle.

18. The printed circuit board of claim 17 further comprising a ring element attached to the printed circuit board for supporting a portion of the electrical contact.

19. A printed circuit board for making electrical connection to a set of electrical pads of a spindle of a disc drive, the printed circuit board comprising:

motor controller electronics associated with the printed circuit board;

a plurality of contact pads for making electrical connection to the motor controller electronics, the printed circuit board having a spindle access opening therein, the plurality of contact pads of the printed circuit board positioned near the spindle access opening in the printed circuit board;

an electrical contact having a first end and a second end, the first end electrically attached to one of the plurality of contact pads of the printed circuit board and the second end positioned to contact one of the pads associated with the spindle; and a ring element attached to the printed circuit board for supporting a portion of the electrical contact, the printed circuit board having openings about a peripheral edge of the spindle access opening, the ring element having at least two flexible fingers which extend into the openings about the peripheral edge of the spindle access opening.

* * * * *